United States Patent [19]

Olsen

[11] 4,121,568
[45] Oct. 24, 1978

[54] SOLAR PANEL FLAT PLATE COLLECTOR

[76] Inventor: James Percival Olsen, 829 Bon Accord St., Fergus, Ontario, Canada, N1M 3A3

[21] Appl. No.: 678,616

[22] Filed: Apr. 20, 1976

[51] Int. Cl.² ................................................ F24J 3/02
[52] U.S. Cl. ..................................... 126/271; 237/1 A
[58] Field of Search ............... 126/270, 271; 237/1 A; 203/DIG. 17; 202/234, 236

[56] References Cited

U.S. PATENT DOCUMENTS

| | | | |
|---|---|---|---|
| 3,146,774 | 9/1964 | Yellott | 126/271 |
| 3,254,643 | 6/1966 | Thomason | 126/271 |
| 3,387,602 | 6/1968 | Thomason | 126/271 |
| 3,918,430 | 11/1975 | Stout et al. | 126/271 |
| 3,923,038 | 12/1975 | Cutchaw | 126/271 |
| 3,929,122 | 12/1975 | Alkasab | 126/271 |
| 3,931,806 | 1/1976 | Hayes | 126/400 |
| 3,991,742 | 11/1976 | Gerber | 126/271 |
| 3,995,804 | 12/1976 | Folds et al. | 237/1 A X |
| 3,995,805 | 12/1976 | Folds et al. | 237/1 A X |
| 3,996,918 | 12/1976 | Quick | 126/270 |

FOREIGN PATENT DOCUMENTS 1,223,851  3/1971  United Kingdom .................... 126/271

*Primary Examiner*—Kenneth W. Sprague
*Assistant Examiner*—Larry Jones

[57] ABSTRACT

The specification teaches a system for collecting heat energy from solar radiation to heat a liquid medium. The system includes a solar radiation collector plate which has its rear face adapted to cause a liquid medium to be in direct thermal contact with the rear face of the plate while flowing over and covering essentially all of the rear face. According to one important aspect of the invention, the rear face is provided with a material having capillary attraction properties to spread a liquid medium across essentially all of the rear face of the plate so that the liquid medium absorbs large amounts of heat energy from the collector plate.

14 Claims, 4 Drawing Figures

SOLAR PANEL FLAT PLATE COLLECTOR

FIELD OF THE INVENTION

This invention relates to a system for collecting heat energy from solar radiation to heat a liquid medium and more particularly relates to a solar radiation collector plate which has its rear face adapted to cause a liquid medium to flow over and to cover essentially all of the rear face of the plate and to be in direct thermal contact with essentially all of the rear face.

BACKGROUND OF THE INVENTION

Conventional solar radiation collectors used to heat a liquid medium include collector plates which are provided with tubing through which the liquid medium passes. This type of collector is expensive to construct and easy to damage as the tubes ae often broken or loosened from the surface of the plate due to temperature variations and thermal expansion. Further, with existing collector plates a liquid medium does not flow over and cover essentially all of the rear face of the plate. Instead, the liquid medium flowing through the tubing is in contact with only discrete portions of the plate. This means that a large amount of heat energy collected by the plate is not directly absorbed by the liquid medium because much of the heat energy must be conducted across the plate and through the tubing before reaching the liquid medium. This results in an inefficient operation of the collector.

The free liquid medium flow rates over the rear face of other types of conventional collector plates is also limited. The liquid medium flows down the rear face of the plate very quickly in samll streams and cannot be effectively heated at high flow rates because the heat energy must be conducted across the plate in order to heat the small streams.

It is therefore an object of the present invention to overcome the above problems by providing a solar radiation collector plate which collects heat energy to heat a liquid medium and which has a rear face adapted to cause a liquid medium to flow over in direct thermal contact with and to cover essentially all of the rear face at a variety of flow rates.

It is another object of the invention to provide a solar radiation collector plate for use in a solar radiation collector which collects heat energy to heat a liquid medium which is highly efficient, inexpensive to construct and more durable.

It is a further object of the invention to provide a solar radiation collector in which collected heated energy is efficiently transferred to and absorbed by a liquid medium.

It is yet another object of the invention to provide a solar radiation collector plate from which a liquid medium absorbs substantial amounts of heat energy while flowing thereover at a relatively higher flow rates.

BRIEF SUMMARY OF THE INVENTION

The solar radiation collector plate according to this invention collects heat energy to heat a liquid medium flowing over and in direct thermal contact with the rear face thereof. The rear face is adapted to cause a liquid medium to flow over and to cover essentially all of the rear face thereby absorbing large amounts of heat energy from the collector plate.

According to one important aspect of the invention the rear face of the plate is provided with a material having capillary attraction properties to spread a liquid medium across essentially all of the rear face of the plate as it gravitates therealong.

The plate is adapted for use in a solar radiation collector which comprises a support frame, pane means to permit solar radiation to enter the collector, means for supplying a liquid medium to the collector and means for collecting a liquid medium from the collector.

The collector receives radiant energy in the form of direct radiation from the sun and diffuse radiation scattered from the atmosphere. The heat energy from the radiation is collected by the collector plate. A liquid medium, preferably water, is fed to the collector from a thermally insulated storage tank. The liquid medium flows down the plate in a thin film and covers essentially all of the rear face. As it gravitates therealong it absorbs heat energy from the plate by direct thermal contact. The heated water can then be collected and transferred for use at a desired location.

DESCRIPTION OF THE DRAWINGS

The aforementioned and other objects, advantages and features of the invention will become apparent in the following detailed description of the preferred embodiments according to this invention as shown in the drawing wherein.

DETAILED DESCRIPTION OF THE PREFERRED EMBODIMENTS

Figure 1:
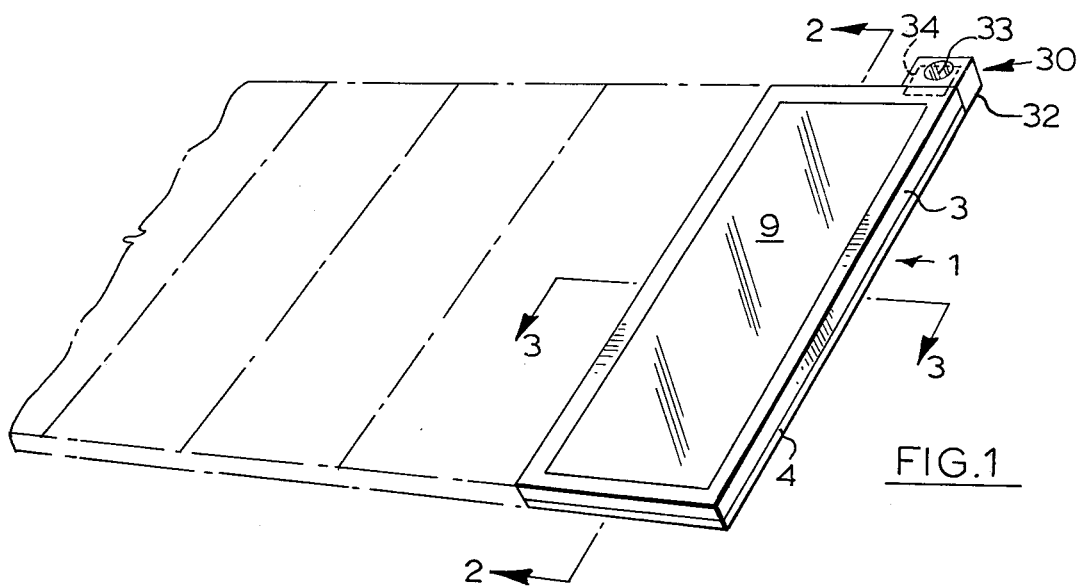
FIG. 1 is a perspective view of a solar radiation collector according to a preferred embodiment of the invention.
Figure 2:
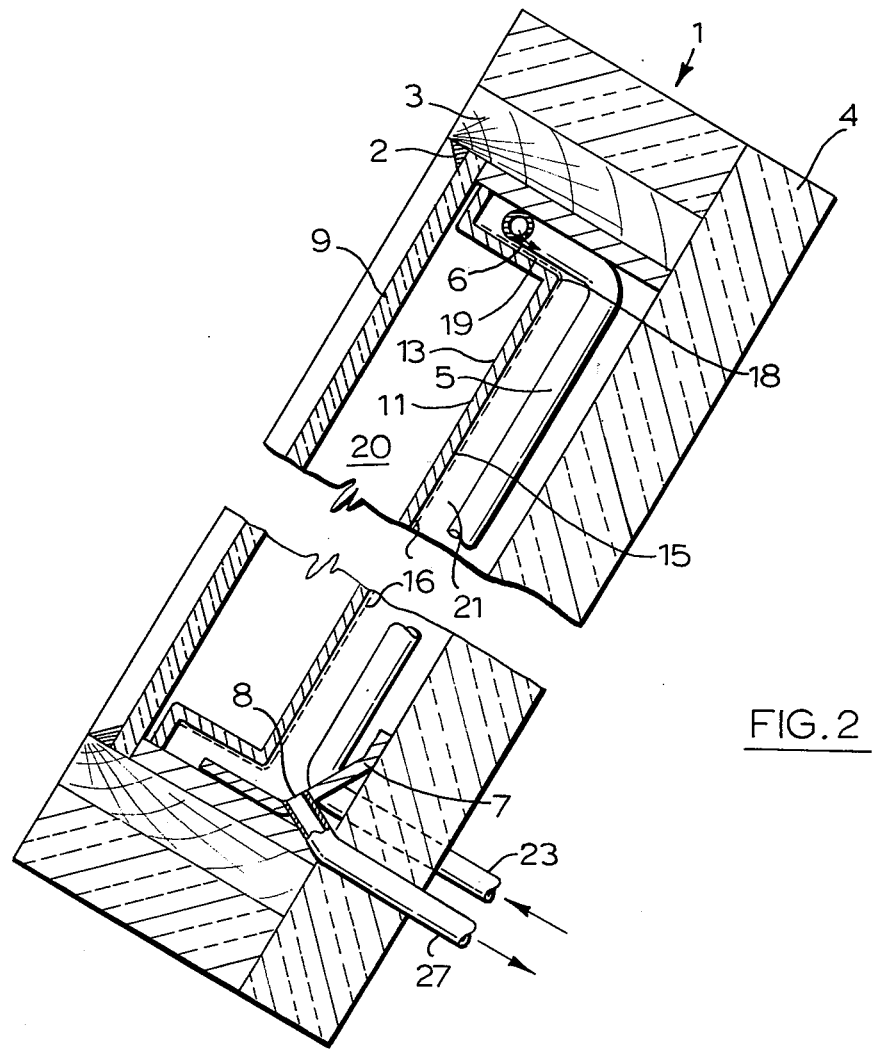
FIG. 2 is a broken cross-sectional view taken along the line 2—2 of FIG. 1.
Figure 3:
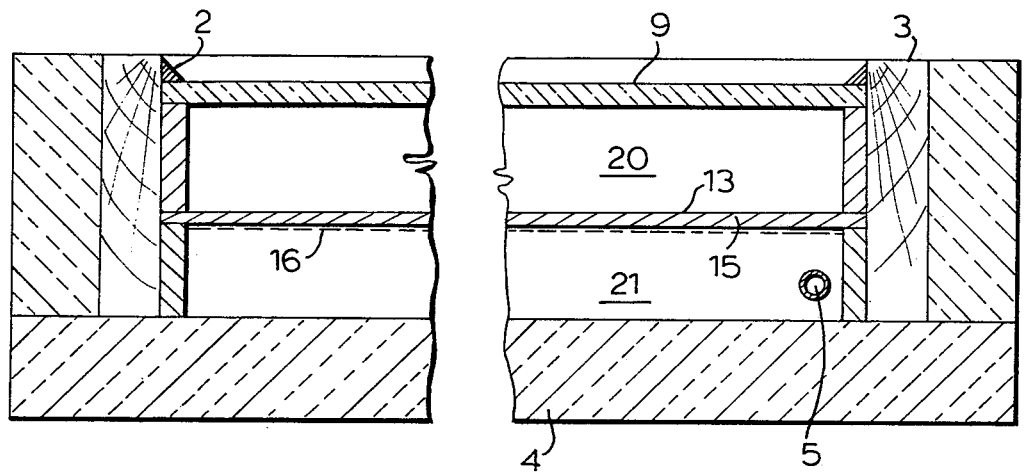
FIG. 3 is a broken cross-sectional view taken along line 3—3 of FIG. 1.

Referring to FIGS. 1, 2 and 3 solar radiation collector, generally indicated at 1, comprises a support frame 3, means for supplying a liquid medium, such as, manifold 5, means for collecting a liquid medium in the form of trough 7, pane means consisting of glass panel 9 and a solar radiation collector plate in the form of an essentially flat metal sheet 11. Water absorbent cloth 16, having capillary attraction properties is mounted adjacent the rear face 15 of flat metal sheet 11. Heat sensor 30 is located externally of the solar radiation collector and at the same angle to incident radiation.

Support frame 3 may be provided with insulation means 4, such as, styrofoam, fibreglass and sealant to substantially reduce heat energy losses through the support frame. The styrofoam is specially treated to be impervious to water and water vapour.

Glass panel 9 is secured to support frame 3 by any suitable means such as, quarter-round 2. The edge of the glass panel may also be countersunk in the support frame. It is understood that the pane means could include any material which is transparent or substantially transparent to solar radiation. The pane means could consist of one or more rigid sheets of impermeable transparent material. When using two or more sheets they should be adaquately spaced from one another so that a thermal insulating layer of air is trapped between them.

Flat metal sheet 11 is secured at its periphery to support frame 3. In this embodiment, the metal sheet is provided at its upper end with bend 18, such that ledge 19, which is intregal with metal sheet 11, lies at approximately right angles to rear face 15 of the metal sheet. The metal sheet is preferably coated on the front face with a black substance having a high absorbtivity in the 0.3 to 2.0 micron wavelenth range to efficiently absorb heat from solar radiation and a low emissivity in the 5 to 10 micron wavelength range to retain the heat energy which has been absorbed. The front face 13 of metal sheet 11 is spaced from glass panel 9 so that a thermal insulating layer of air 20 is trapped between the metal sheet and the glass panel. Rear face 15 of the metal sheet is spaced from the support frame such that thermal insulating layer of air 21 is trapped between the metal sheet and the support frame.

It is understood that the plate could also be constructed of any material which is a good conductor of heat energy. The material should also have a low specific heat so that the plate has a rapid temperature response to incoming radiation. An example of such a material would include a rigid plastic, such as, Teflon [1], Vespel [2], or Kel-F [3]. It is also understood that the rear face of the collector plate could be adapted in a different manner from that described above. One alternative is to roughen or treat the rear face with a surface active agent so that as a liquid medium flows down the plate it is spread across the plate in a thin film to cover essentially all of the rear face of the plate.

[1] Trade mark for a tetrafluoroethylene polymer.
[2] and [3] Trade marks for tetrafluoroethylene-hexachloroethylene copolymers.

Sheet of cloth 16 is attached to the periphery of metal sheet 11 so that it covers essentially all of rear face 15. The cloth must be mounted so that when it becomes wet the cloth is attracted to the rear face of the metal sheet.

Sheet of cloth 16 may be provided with small slits which are randomly located throughout the sheet of cloth. The slits release air which may be trapped between the cloth and the rear face of the plate.

It is also understood that any material having capillary attraction properties or any other properties which would cause a liquid medium to spread over essentially all of the rear face of the plate could be used. An example of a material having other properties which would be suitable for use is an open-celled foamed plastic, such as sponge applied in a thin layer. The plastic used would be one which would not be susceptible to hydrolitic aging. It could also be provided with an impervious outer skin to seal it and prevent water from dripping off the rear face of the plate.

Referring now to the means for supplying a liquid medium, an upper portion of manifold 5 extends over and along ledge 19 of metal sheet 11. This portion is provided along its length with perforations 6.

With respect to the means for collecting a liquid medium, trough 7 is provided with aperture 8 located at the lowest point in the trough. The trough is arranged at the lower end of metal sheet 11, such that essentially all of the water flowing down rear face 15 runs off the plate and into the trough.

Figure 4:
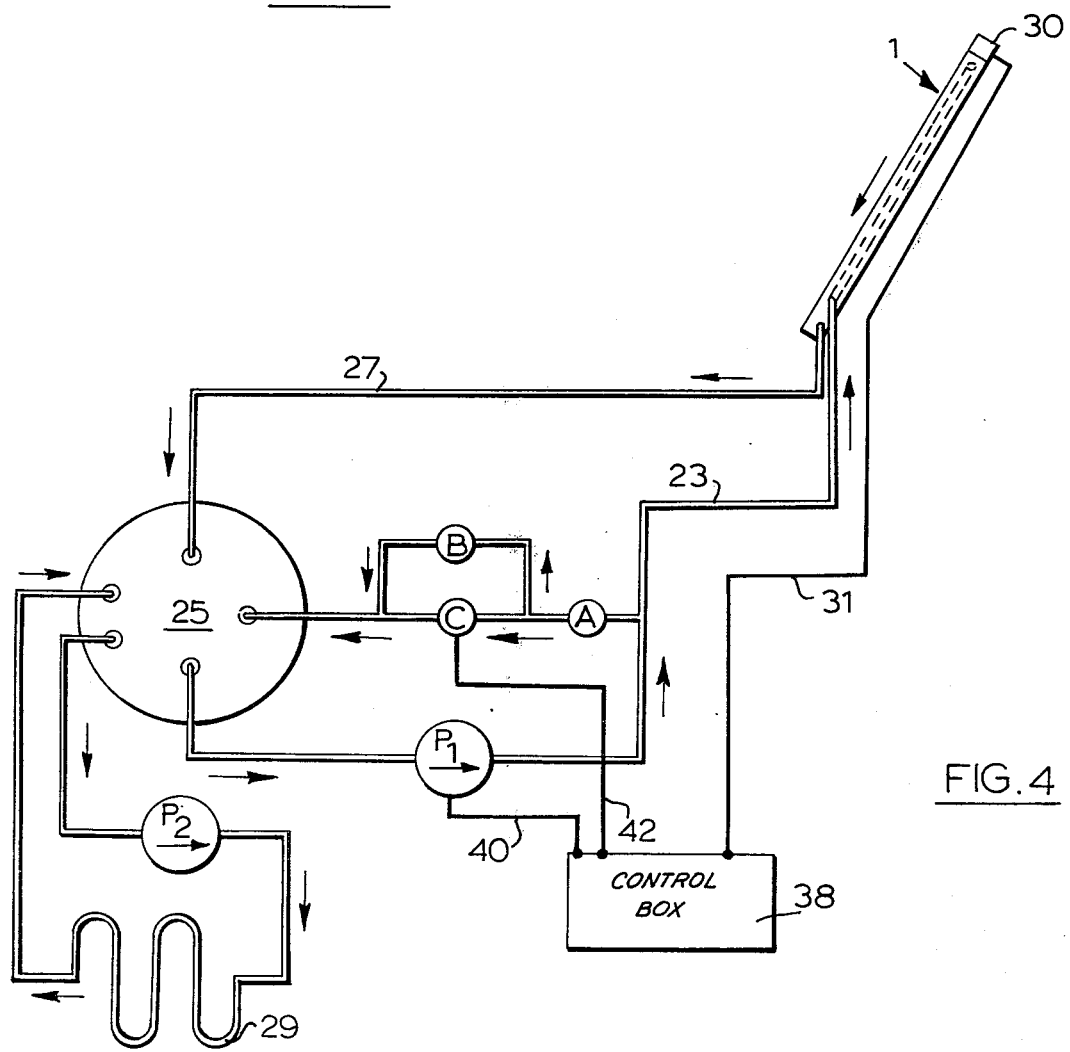
FIG. 4 is a schematic showing a solar radiation collector system including storage tank, valves and pumps.

As shown in FIG. 4, feed line 23 connects manifold 5 to insulated storage tank 25, while return line 27 connects trough 7 at aperture 8 to the storage tank. Both feed line 23 and return line 27 are insulated.

Feed line 23 includes pump $P_1$, manual control valve A, manual control valve B and automatic on-off valve C. Pump $P_1$ and valve C are connected to control box 38 by electrical wires 40 and 42 respectively. Control box 38 is connected to heat sensor 30 by double electrical wire 31.

Heat sensor 30 has a somewhat similar construction to solar radiation collector 1. The heat sensor includes sensor frame 32, a sensor pane means 33 and heat sensor collector plate 34 which is located inside the heat sensor spaced from heat sensor pane means 33. Heat sensor collector plate 34 is constructed from the same material as metal sheet 11 and coated in the same manner as the metal sheet. However, the heat sensor collector plate is not adapted to cause a liquid medium to flow over essentially all of its rear face and a liquid medium does not flow through the heat sensor.

Solar radiation collector 1 and heat sensor 30 are arranged and positioned such that flat metal sheet 11 and heat sensor collector plate 34 collect heat energy from solar radiation entering the respective pane means. The glass found in the pane means of both collector 1 and heat sensor 30, not only permits radiation to enter, but it also reduces radiation losses because it is opague to the long wavelength radiation emitted by the surface of the respective collector plates. Thermal insulating layer 20 in collector 1 also helps to reduce the loss of heat energy by conduction through the front of the collector.

The temperature of both flat metal sheet 11 and heat sensor collector plate 34 begins to increase at about the same rate. The temperature increase is dependent upon the amount of sunlight incident on the metal sheet and collector plate. The temperature of heat sensor collector plate 34 is constantly relayed to control box 38 via double electrical wire 31. When collector plate 34 reaches a first desired temperature, pump $P_1$, which is controlled by control box 38, begins operation. Manual control valve A is preset to allow water to enter feed line 23 from storage tank 25 at a predetermined rate, such as, 1/2 gallon per hour per square foot of collector plate surface area. Any excess water which enters the feed line flows back to the storage tank through valve C which is in an open position.

The water flows through feed line 23 into manifold 5 and out perforations 6 onto cloth 16 provided on the upper surface of ledge 19. The water begins to spread across and penetrate through cloth 16 because of the capillary attraction properties of the cloth. Ledge 19 assists in the spreading of the water. However, if ledge 19 were not provided, the capillary attraction properties of cloth 16 would be adequate to spread the water.

As the water spreads across and penetrates through the cloth, a thin film of water flows between metal sheet 11 and cloth 16 on the metal sheet. The water which is in direct thermal contact with rear face 15 gravitates therealong and thereby absorbs heat energy from metal sheet 11.

The temperatures of both the metal sheet and the heat sensor collector plate will continue to rise although the temperature increase of metal sheet 11 will not be as rapid as that of the heat sensor collector plate once water begins to flow through solar radiation collector 1. When heat sensor collector plate 34 reaches a second desired higher temperature, automatic on-off valve C, which is also controlled by control box 38, closes so that no water flows back into the storage tank through valve C and the flow of water in feed line 23 increases to a suitable rate such as 1½ gallons per hour per square foot of collector plate surface area. The amount of increase is governed by preset manual valves A and B. As a result of the increased flow rate through feed line 23, more water flows through collector 1 and gravitates down the rear face of the metal sheet. Due to the capillary attraction properties of cloth 16, the water does not drip off rear face 15 at the higher flow rate. Furthermore, as can be seen in FIGS. 2 and 3, the surface of the cloth remote from the panel is exposed to thermal insulating layer 21 and is free to contact with and spaced from the rear insulation of the panel. Therefore there is no constriction to increasing the flow rate, as would be the case if the cloth were compressed between sandwiching surfaces. The higher heat input coupled with the increase in the flow rate assures the most efficient use of the increased direct thermal contact between the collector plate and the water.

Some of the water flowing down the rear face of the metal sheet will evaporate. However, condensation on glass panel 9 is prevented because metal sheet 11 is secured and sealed at its periphery to support frame 3 as earlier discussed. Therefore, the water vapour cannot fog the glass panel because it is trapped between the rear face of the sheet of metal and the support frame.

When the heated water reaches the bottom edge of the metal sheet, it flows off rear face 15 into trough 7 and out aperture 8 into return line 27. The return line transfers the heated water back to insulated storage tank 25 where it is available to be transferred via pipe 29 to any desired location.

Pipe 29 runs through various heat exchangers located in a building or dwelling. Examples include the heat exchangers found in furnaces, radiators or any other type of heater used to warm the house. After the water passes through the heat exchangers and gives off heat energy, it flows back to storage tank 25.

The entire system is preferably arranged so that collector 1, feed line 23 and return line 27 automatically drain during periods when metal sheet 11 falls below the first desired temperature as measured by the heat sensor and pump $P_1$ is not in operation. The automatic draining can be accomplished in a number of ways. The easiest method being to arrange the feed line and the return line in an inclined position such that any water which remains in the lines when pump $P_1$ is not functioning, flows back to the storage tank. The water flows directly down return line 27 to tank 25. In the case of feed line 23, the water flows down the feed line through valve A and through automatic on-off valve C, to storage tank 25. Valve C is again open when pump $P_1$ is not in operation.

Although various preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. In a solar radiation collector which collects heat energy to heat a liquid medium, a support frame, pane means, a solar radiation collector plate supported by said support frame, means for supplying a liquid medium to the upper end of said collector plate and means extending completely across the lower end of said collector plate for collecting a liquid medium as it flows from said collector plate; said plate having a front face and a rear face; said rear face being provided with a liquid absorbent material which, due to its absorbent properties, causes a liquid medium which is in direct thermal contact with said rear face to spread across and cover essentially all of said rear face, whereby as a liquid medium gravitates along said rear face, it collects heat energy conducted through said collector plate from essentially all of said rear face.

2. An apparatus as claimed in claim 1 wherein said solar radiation collector plate is an essentially flat sheet of metal.

3. An apparatus as defined in claim 2 wherein said material is water absorbent and is in a sheet form mounted to said collector plate adjacent said rear face.

4. An apparatus as claimed in claim 2 wherein said essentially flat sheet of metal has a front face which is provided with a black coating for maximum radiation absorption.

5. An apparatus as defined in claim 3 wherein said water absorbent material is a sheet of cloth.

6. An apparatus as defined in claim 5 wherein said sheet of cloth is provided with small slits randomly located through said sheet of cloth.

7. An apparatus as claimed in claim 1 wherein said pane means includes at least one substantially transparent rigid sheet of impermeable material spaced from said front face of said metal sheet to trap a thermal insulating layer of air therebetween.

8. An apparatus as claimed in claim 1 wherein said pane means includes a first and a second glass panel, said first glass panel being spaced from said front face to trap a thermal insulating layer of air therebetween, said second glass panel being spaced from said first glass panel to trap a thermal insulating layer of air therebetween.

9. An apparatus as claimed in claim 1 wherein said support frame includes insulating means, said insulating means comprising styrofoam and sealant to substantially eliminate all heat losses through said support frame.

10. An apparatus as claimed in claim 9 wherein said rear face is spaced from said support frame to trap a thermal insulating layer of air therebetween.

11. An apparatus as defined in claim 1 wherein said liquid absorbent material is a sheet of cloth having capillary attraction properties mounted adjacent said rear face, said sheet of cloth being provided with randomly located small slits.

12. A solar radiation collector plate as claimed in claim 1 wherein the surface of said liquid absorbent material remote from said rear face is uncovered.

13. A solar radiation collector which collects hear energy to heat a liquid medium, and which comprises: an insulated support frame, pane means, a solar radiation collector plate having a rear face and a front face, means for supplying a liquid medium to the upper end of said collector plate, and means extending completely across the lower end of said collector plate for collecting a liquid medium flowing from said collector plate; the rear face of said collector plate being provided with a liquid absorbent material, which due to its absorbent properties causes a liquid medium to spread across and to cover essentially all of said rear face, whereby as a liquid medium gravitates down along it collects heat energy conducted through said collector palte from essentially all of said rear face by direct thermal contact with said rear face; said pane means being spaced from said front fact to trap a thermal insulating layer of air therebetween; said rear face being spaced from said support frame to trap a thermal insulating layer of air therebetween.

14. An apparatus as claimed in claim 13 wherein said solar radiation collector plate is an essentially flat sheet of metal and said material having capilliary attraction properties is a sheet of cloth mounted adjacent said rear face, said sheet of cloth being provided with small slits randomly located throughout said sheet.

* * * * *